Jan. 27, 1970  H. BLOOMFIELD ET AL  3,491,924
POURING SPOUTS FOR DECANTERS
Filed Jan. 8, 1968
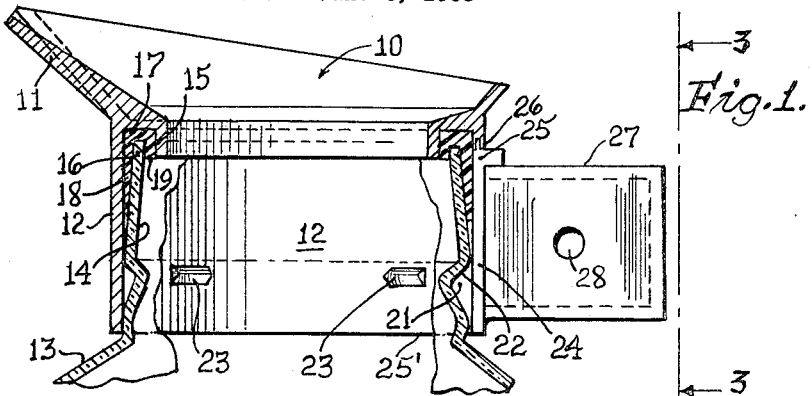
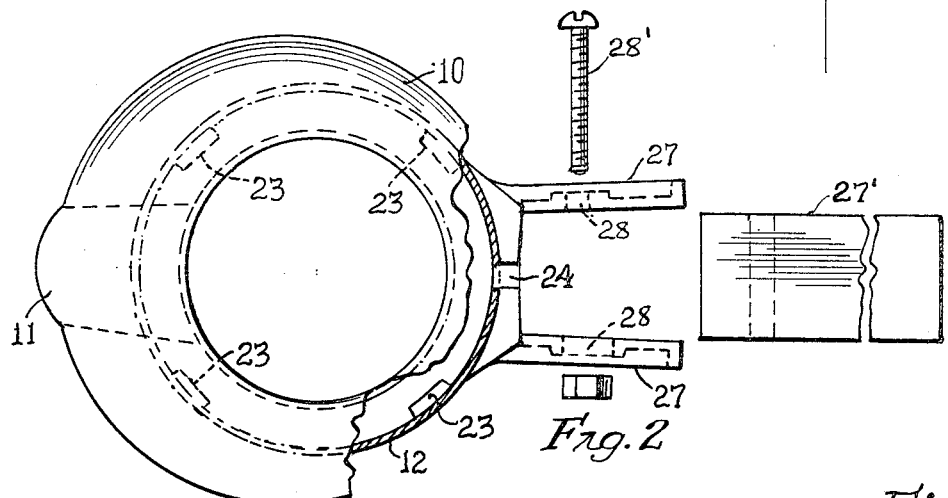
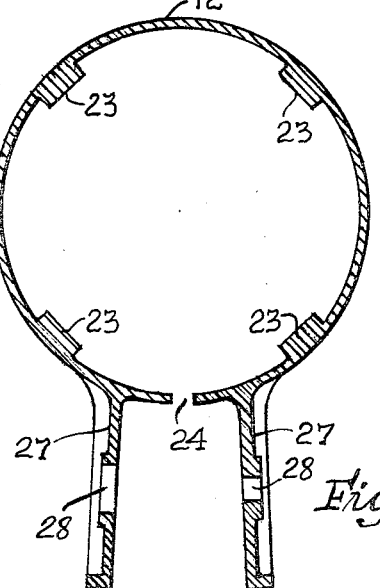
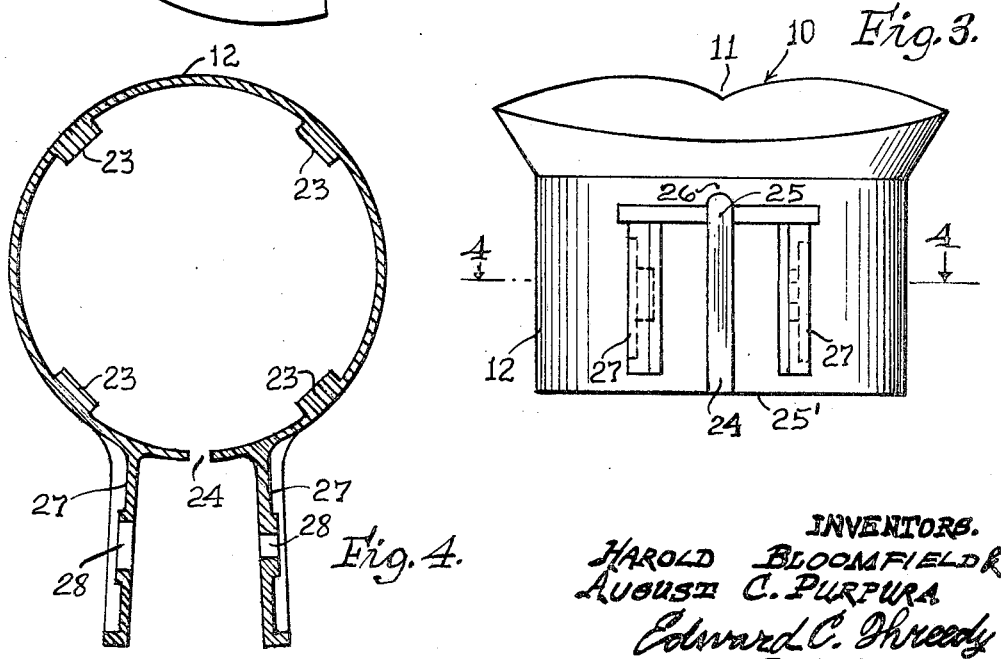
INVENTORS.
HAROLD BLOOMFIELD &
AUGUST C. PURPURA
Edward C. Threedy
THEIR ATTORNEY.

United States Patent Office 3,491,924
Patented Jan. 27, 1970

3,491,924
POURING SPOUTS FOR DECANTERS
Harold Bloomfield and August C. Purpura, Chicago, Ill., assignors to Bloomfield Industries, Inc., Chicago, Ill., a corporation of Illinois
Filed Jan. 8, 1968, Ser. No. 696,460
Int. Cl. B65d 25/48
U.S. Cl. 222—567          3 Claims

ABSTRACT OF THE DISCLOSURE

A pouring spout for a decanter, the latter having a neck to which the spout is attached, the spout having a skirt embracing the neck and slotted transversely so that when the spout is attached to an end of a handle the skirt will be drawn tightly about the neck to effect compression of a resilient sealing gasket disposed between the neck and the spout, resulting in a liquid-tight seal between the skirt and the decanter neck.

Summary of the invention

A pouring spout having a depending skirt which is adapted to embrace the neck of a decanter with a resilient sealing gasket disposed between the pouring spout and the upper edge of the neck, the gasket adapted to be compressed into liquid-tight seal by an arrangement effective when the spout is attached to a handle for the decanter. Pouring spouts of this nature are generally classified in Class 222.

The invention consists in the novel combination and arrangement of parts to be hereinafter described and claimed.

The invention will be best understood by reference to the accompanying drawings showing a preferred form of construction in which:

FIG. 1 is a vertical sectional detailed view of a pouring spout and neck of a decanter, the handle of the decanter being omitted;

FIG. 2 is a plan view partly in section of the same showing the handle and attaching bolts in exploded relation to the spout;

FIG. 3 is an elevational view of the same taken substantially on line 3—3 of FIG. 1, and FIG. 4 is a fragmentary sectional detailed view of the same taken substantially on line 4—4 of FIG. 3.

The present invention is an improvement over that shown in our United States Patent No. 3,330,449 dated July 11, 1967.

The decanter shown in the drawings includes a pouring spout 10 which has an integral pouring lip 11 and a depending skirt 12. The decanter bowl is fragmentarily shown at 13 and comprises a neck 14. The pouring spout 11 is provided with an internal channel 15 opening in a downward direction. The upper edge portion 16 of the neck extends into this channel 15. Mounted upon and surrounding the end portion 16 of the neck is a sealing gasket 17 formed of suitable resilient and heat resistant material well-known in the art.

The outer wall 18 of the gasket 17 extends downwardly between the edge portion 16 of the neck 14 and the skirt 12, and is of a greater width than that of the inner wall 19 of the gasket.

The neck of the decanter includes a groove 21 which extends around the neck 14. The wall portions 22 of this groove are tapered inwardly and downwardly, and are adapted to be engaged by spaced elongated ribs 23 formed in the inside wall of the skirt 12, in such a manner that the ribs will engage the walls 22 and bear the spout down upon the neck so as to compress the gasket within the channel 15, thus to provide a liquid-tight seal blocking out the admission of liquid or moisture between the spout and neck of the decanter which, if permitted, would result in a discoloration of the decanter neck.

Our present improvement has to do with more effectively effecting the seal between the spout and the decanter neck.

This is accomplished by providing a skirt 12 which is substantially pliable. In the skirt there is provided a vertically extending slot 24, the upper end portion 25 of which terminates below the top edge of the spout 10 at which point there is a relatively thin wall portion 26 to allow the skirt 12 to have more flexibility when it is drawn tightly about the neck 14 of the decanter. As shown the slot is open at the lower edge portion 25 of the skirt.

Handle attaching lugs 27 are integrally formed with the skirt on opposite sides and in spaced relation with respect to the slot 24. The lugs 27 diverge outwardly with respect to each other from the direction of the skirt 12. In these lugs are provided openings 28 for the passage of a bolt 28′ which attaches an end of a handle 27′ to the spout between the lugs 27.

When the lugs 27 are drawn by the bolt 28′ into clamping relation with respect to the end of the handle 27′, the skirt 12 being of pliable material and substantially flexible at the top of the slot 24 at the area of the thin wall 26 will be drawn tightly against the neck 14 compressing the leg 18 of the gasket between the skirt 12 and the neck 14, thus to provide, as before stated, a liquid-tight seal.

During this clamping of the handle between the lugs 27 and the tightening of the skirt 12 about the neck 14 the elongated ribs 23 will be caused to engage the surface 22 and cam the spout downwardly against the gasket 17. As the outer end of the neck 14 is tapered inwardly as shown in FIG. 1, this camming of the spout will effect a liquid-tight seal between the skirt of the spout and the neck of the decanter as well as over and around the outer edge of the neck of such decanter. As is apparent, this liquid-tight seal is accomplished by a construction which is simple and inexpensive.

While the spout, as shown and described in our aforementioned patent, has been highly successful and has proven to accomplish the results attributed to it, the present construction results in the production of a spout, which is of an economical construction and one which assures the aforementioned liquid-tight seal between the spout and the neck of the decanter.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. An improvement in a pouring spout for a decanter, the latter having a sealing gasket mounted between the spout and the neck of said decanter, said neck and said spout having cooperative means for compressing said gasket therebetween to effect a liquid-tight seal, the improvement comprising a pliable skirt integral with the spout and embracing the neck and having a transversely extending slot formed therein from one edge thereof and terminating short of the top of the spout, handle connecting lugs integral with the skirt on opposite sides of the slot, said lugs diverging outwardly from each other in a direction from the neck and adapted when drawn toward each other to clamp a handle therebetween to clampingly compress the skirt upon the neck of the decanter to cause said cooperating means to compress the gasket between the neck of the decanter and the spout to provide said liquid-tight seal.

2. The improvement defined in claim 1 characterized by the provision of a thin wall portion in the neck at the end of said slot terminating short of the top of the spout to increase circumferential flexibility of said skirt.

3. The improvement defined in claim 1 wherein said cooperative means for compressing the gasket includes a circumferential groove formed in the neck of the spout and having a camming surface and a plurality of spaced camming lugs formed on the skirt and adapted to engage such camming surfaces to move the spout in compressing relation with respect to said gasket.

References Cited

UNITED STATES PATENTS

| 3,114,484 | 12/1963 | Serio | 222—465 |
| 3,154,227 | 10/1964 | Anderson et al. | 222—542 |
| 3,330,449 | 7/1967 | Bloomfield et al. | 222—542 X |

ROBERT B. REEVES, Primary Examiner

FREDERICK R. HANDREN, Assistant Examiner

U.S. Cl. X.R.

222—475, 542